3,210,411
HYDROGENATION OF BENZOIC ACID TO CYCLOHEXANE-CARBOXYLIC ACID
Pieter Mars, Geleen, Netherlands, assignor to Stamicarbon N.V., Heerlen, Netherlands
No Drawing. Filed Oct. 2, 1961, Ser. No. 142,017
Claims priority, application Netherlands, Oct. 4, 1960, 256,524; Apr. 28, 1961, 264,221
4 Claims. (Cl. 260—514)

The present invention relates to the hydrogenation of benzoic acid to cyclohexane-carboxylic acid.

Prior to the present invention, the hydrogenation of benzoic acid to cyclohexane-carboxylic acid has been a scientific possibility, which had not been realized in practice. However, it is common knowledge that other products, such as esters, ethers, and alcohols, can be obtained by hydrogenation of carboxylic acids including benzoic acids.

It has been found, according to the present invention, that benzoic acid can be hydrogenated to cyclohexane-carboxylic acid, virtually without any by-products being formed, by bringing vaporous benzoic acid, together with hydrogen, at a temperature between the melting and boiling points of benzoic acid at the prevailing pressure, into contact with a catalyst comprising one or more of the following metals in the metal form: palladium, rhodium, ruthenium, platinum, iridium, nickel, cobalt. The catalysts, which are used in the metal form, can be used on a carrier, e.g. thorium oxide, aluminum oxide or silica gel.

The process can be carried out in a simple way by passing hydrogen through molten benzoic acid and bringing the resulting mixture of benzoic acid vapour and hydrogen into contact with the catalyst. Assuming atmospheric pressure conditions, the temperature of the vaporous benzoic acid and hydrogen during contact with the catalyst should be between 122° C. and 249° C.

As one alternative to this way of forming the benzoic acid vapour and hydrogen mixture, it may, e.g., be formed by separate evaporation of benzoic acid, if so desired with the aid of an inert gas such as nitrogen, hydrogen being added subsequently. The reaction is not hindered by the presence of an inert gas.

The process according to the invention may be carried out at atmospheric pressure, but a lower pressure or a higher pressure, e.g., 10, 25, 50, 100 atm., or a still higher pressure, may also be used. The use of a high pressure makes it necessary for the hydrogenation apparatus to be capable of enduring that pressure.

The measures taken for the supply of the reaction components, the control of the temperature and of the pressure, the discharge of the reaction mixture, and also for the realization of a continuous process, may be as known per se in hydrogenation processes, and they need no further elucidation.

The process may be carried out continuously and the non-converted benzoic acid and the un-consumed hydrogen may be recycled. In such cases it may be found that after some time the activity of the catalyst decreases. This impairment of the catalyst can be avoided or reduced by carrying out the hydrogenation in the presence of molecular oxygen. The oxygen can, if desired, be employed in the form of an oxygen-containing gas, such as air. Even if very small amounts, less than 1% by volume, of oxygen with respect to the amount of hydrogen, for instance 0.1, 0.2 or 0.6% by volume of oxygen, are used, the life of the catalyst is considerably prolonged. To guarantee safety of the hydrogenation process, it is advisable that the explosive limit of the gas mixture not be exceeded. For that reason, in general it is preferred to use not more than 5% by volume of oxygen.

*Example 1*

In a cylindrical evaporation chamber (capacity: 1 litre) hydrogen is passed through 300 g. of molten benzoic acid at a temperature of 134° C. By the gradual supply of benzoic acid the amount of this acid in the evaporation chamber is kept constant. The resulting mixture of acid vapour and hydrogen, which contains 1.6% by volume of benzoic acid, is passed, at atmospheric pressure, through a U-shaped reaction tube (sectional area: 1 cm.$^2$), into which 25 cm.$^3$ of catalyst has been brought. The rate of passage of the gas-vapour mixture is so adjusted that benzoic acid is introduced into the reaction tube at the rate of 0.1 kg. per litre of catalyst and per hour. The temperature in the reaction tube is kept at 147° C. The catalyst is nickel on aluminium oxide (15% Ni), in the shape of tablets with a diameter of 3–4 mm.

The gas-vapour mixture issuing from the reaction tube is cooled to 35° C. in a condensation chamber. The non-condensed gas, which consists practically entirely of hydrogen, is returned to the evaporation chamber.

The reaction product, which consists practically entirely of cyclohexane-carboxylic acid with some non-converted benzoic acid (less than 2%) is discharged from the condensation chamber. At room temperature the product crystallizes into a white crystal mass, from which, by recrystallization from ethanol, pure cyclohexane-carboxylic acid (melting point 31° C.) is obtained.

*Example 2*

The hydrogenation of benzoic acid is carried out in the way described in Example 1, with the aid of a palladium catalyst (0.4% Pd) on an aluminium oxide carrier.

For this hydrogenation the following reaction conditions are chosen:

Temperature in the evaporation chamber ____° C__ 138
Temperature in the reaction tube _____° C__ 139
Rate of passage: kg. of benzoic acid/litre of catalyst/hr. _____ 0.04

Also in this way a reaction product is obtained which consists practically entirely of cyclohexane-carboxylic acid with a small amount of benzoic acid (less than 2%).

*Example 3*

Under otherwise the same conditions as described in Example 1, the hydrogenation is carried out as follows (catalyst, platinum on Al$_2$O$_3$, 0.4% Pt);

Temperature in the evaporation chamber ____° C__ 133
Temperature in the reaction tube _____° C__ 162
Rate of passage _____kg__ 0.02

The result is the same as that of Example 1.

*Example 4*

Under otherwise the same conditions as described in Example 1, the hydrogenation is carried out as follows (catalyst, rhodium on Al$_2$O$_3$, 0.5% Rh):

Temperature in evaporation chamber _____° C__ 140
Temperature in reactor _____° C__ 155
Rate of passage _____kg__ 0.1

The resulting cyclohexane-carboxylic acid contains less than 2% benzoic acid, while there is 0.1% toluene in the reaction product.

*Example 5*

In a cylindrical evaporation chamber (capacity 1 litre) hydrogen is passed through 300 g. of molten benzoic acid at a temperature of 130° C. By the gradual supply of benzoic acid the amount of this acid in the evaporation chamber is kept constant. The resulting mixture of acid vapor and hydrogen, which contains 1.5% by volume of vaporous benzoic acid, is passed, at atmospheric pressure, through a U-shaped reaction tube (sectional area: 1 cm.$^2$), into which have been brought 25 cm.$^3$ of catalyst. The rate of passage of the gas-vapour mixture is so adjusted that 0.06 kg. of benzoic acid per litre of catalyst is passed into the reaction tube per hour. The temperature in the reaction tube is kept at 141° C. The catalyst used is platinum on aluminium oxide (0.4% of Pt), in the shape of tablets with a diameter of 3–4 mm.

The gas-vapour mixture issuing from the reaction tube is cooled to 35° C. in a condensation chamber. The non-condensed gas, which consists virtually entirely of hydrogen, is returned to the evaporation chamber.

The reaction product, which consists virtually entirely of cyclohexane-carboxylic acid and a small amount of non-converted benzoic acid, is discharged from the condensation chamber. At room temperature the product crystallizes into a white crystal mass, from which, by recrystallization from ethanol, pure cyclohexane-carboxylic acid (melting point 31° C.) is obtained. After 24 hours the initially high conversion, as a result of which less than 2% of non-converted benzoic acid is found in the reaction product, has decreased by 5%. By adding oxygen to the gas-vapour mixture in an amount of 0.2% by volume with respect to the amount of hydrogen, the conversion increases to the initial value.

I claim:
1. A process of hydrogenating benzoic acid to cyclohexane-carboxylic acid which comprises producing a mixture of benzoic acid and hydrogen by passing hydrogen through molten benzoic acid, bringing said mixture into contact with a catalyst in a reaction zone at a temperature between the melting point and the boiling point of benzoic acid at the pressure prevailing in said reaction zone, said catalyst comprises at least one member of the group consisting of palladium, rhodium, ruthenium, platinum, iridium, nickel, and cobalt.

2. A process according to claim 1, wherein molecular oxygen is present in the said reaction zone in an amount of not more than about 5%, based on the volume of hydrogen present in said reaction zone.

3. A process according to claim 1 wherein the pressure prevailing in said reaction zone is from about atmospheric pressure to about 100 atmospheres.

4. A process according to claim 1 wherein the temperature of the benzoic acid vapor and hydrogen in the reaction zone is from about 122° C. to about 249° C.

References Cited by the Examiner

UNITED STATES PATENTS

| 1,877,991 | 9/32 | Schwenk et al. | 260—514 |
| 2,675,390 | 4/54 | Rosenblatt | 260—514 X |
| 2,828,335 | 3/58 | Terstandig et al. | 260—514 |
| 2,888,484 | 5/59 | Dehm et al. | 260—514 |
| 3,141,036 | 7/64 | Winstrom et al. | 260—514 |

OTHER REFERENCES

Ipatieff: "Catalytic Reactions at High Pressures and Temperatures," Macmillian Co., N.Y., 1936, pp. 308–312, 317–318.

Ipatiew et al.: "Deutche Chem. Gesell. Berichte," vol. 59B, pp. 306–311 (1926).

LORRAINE A. WEINBERGER, *Primary Examiner*.
CHARLES B. PARKER, *Examiner*.